Figure 1:
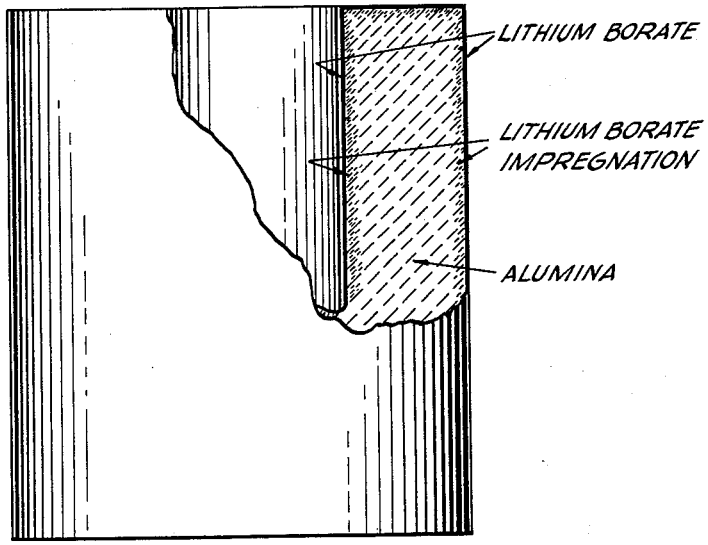

Aug. 14, 1962     W. J. KNAPP     3,049,447
METHOD OF TREATING AN ALUMINA CERAMIC ARTICLE
WITH LITHIUM BORATE
Filed June 30, 1959

*Inventor*
William John Knapp

By Soans, Anderson, Luedeka & Fitch
*Attys*

United States Patent Office 3,049,447
Patented Aug. 14, 1962

3,049,447
METHOD OF TREATING AN ALUMINA CERAMIC ARTICLE WITH LITHIUM BORATE
William John Knapp, Los Angeles, Calif., assignor to General Dynamics Corporation, New York, N.Y., a corporation of Delaware
Filed June 30, 1959, Ser. No. 823,860
5 Claims. (Cl. 117—169)

The present invention relates to ceramics and more particularly relates to an improved high temperature ceramic product having reduced porosity and to a method of making the same.

High temperature ceramic products capable of withstanding temperatures of up to 900° C. or more are becoming important for use in a wide variety of applications, for example, in the field of plasma physics, for electrical discharge tubes, insulators, tool bits, pyrometer-protection tubes and the like. In certain applications it is highly important that the ceramic product not only be strictly stable, thermal shock resistant and chemically inert, but also that it be very resistant to penetration therethrough of fluids at relatively high temperatures. That is, it must have a very low porosity and in certain applications it must be capable of sustaining a vacuum over a long period of time. In this connection, for example, certain plasma physics applications require that even at high temperatures there be little or no leakage of hot plasma through ceramics in contact with such hot plasma.

A simple, inexpensive and highly effective method has now been found for treating ceramic products so as to substantially impermeabilize the same; that is, reduce the permeability thereof to a very low point. A portion of the treatment can be readily carried out at ambient temperature. Moreover, there is no necessity to employ conventional very high firing temperatures. Lithium borate and alumina are utilized for the production of the ceramic products. The improved substantially impermeableized ceramic products obtained therefrom are particularly adapted for use in plasma physics applications wherein it is advantageous to have the ceramic product fabricated of constituents having relatively low atomic numbers. In this connection, energy losses due to excitation of atoms in contact with hot plasma will be less than in the case where ceramic constituents of higher atomic number, such as silicon, magnesium, calcium and the like, are utilized. In such latter cases, considerable quenching may be encountered.

Accordingly, the principal object of the present invention is to provide improved ceramic products having reduced permeability to gases, and a method of making the same. It is also an object of the present invention to provide high temperature low atomic number ceramic products of reduced porosity in a simple and inexpensive manner and a method of making the same.

Figure 2:
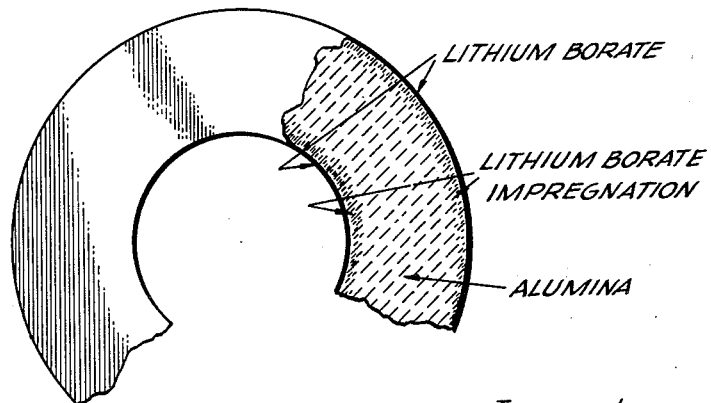

Further objects and advantages of the present invention will be apparent from a study of the following detailed description and the accompanying drawings of which:

FIGURE 1 is a schematic side elevation of an alumina article treated in accordance with the present invention, portions being broken away to illustrate the internal construction thereof; and, FIGURE 2 is a plan view of the article of FIGURE 1, portions being broken away to illustrate the internal construction thereof.

The improved ceramic products of the present invention are provided by a low temperature coating technique. More particularly, ceramic products fabricated of alumina to the desired size and shape are substantially impermeableized, that is, substantially reduced in their porosity to gases, by depositing lithium borate on the surface thereof and then flowing the lithium borate into the pores, depressions, etc., thereof.

The ceramic articles fabricated in any suitable manner of relatively pure alumina can be utilized in the method of the present invention. For example, alumina articles which have been fabricated by conventional methods such as those which call for extrusion or casting of the alumina article at about room temperature, followed by firing at about 1600° C. to about 1900° C., may be employed. Such methods usually cannot provide accurate dimensional control over the product, however, so that grinding, sanding or the like to bring the alumina article, such as a tube, etc., to the desired final size and shape may be necessary. Subsequent treatment with the lithium borate usually does not materially influence either the size or shape of the ceramic article.

Alumina is aluminum oxide, of the formula $Al_2O_3$, having a molecular weight of about 102 and a very high melting point. Lithium borate utilized in the present invention may be any suitable, relatively pure commercially available lithium borate. In this connection, it may be lithium metaborate or lithium tetraborate. Lithium metaborate, $LiBO_2$, has a melting point of about 840–845° C. It is slightly soluble in cold water. A hydrated form of lithium metaborate, that is lithium metaborate dihydrate, $LiBO_2 \cdot 2H_2O$, has the melting point of the anhydrous form and is soluble in water. A more highly hydrated lithium metaborate has the formula $LiBO_2 \cdot 8H_2O$ and a melting point of about 47° C. It is insoluble in water. Lithium tetraborate, $Li_4O_7 \cdot 5H_2O$, is very soluble in cold water. All of the described forms of lithium borate are substantially insoluble in alcohol, acids and the like.

In accordance with the method of the present invention, the lithium borate is first deposited on the surface of the alumina article to be treated. The deposition should preferably be carried out to provide a relatively uniform concentration of lithium borate. This is facilitated by preparing lithium borate in the form of a slurry and coating the surface of the alumina with the slurry, as by brushing on the slurry, etc. The lithium borate may be suspended in any suitable vehicle to form the slurry. In this connection, the vehicle may be alcohol, for example, methyl or ethyl alcohol, or other usual conventional organic solvent, preferably one which readily volatilizes and leaves no deposit other than the lithium borate on the surface of the ceramic article. Alternatively, the lithium borate can be dissolved in a suitable vehicle, for example water, depending on the type of lithium borate and the concentration of lithium borate. In a further technique, dry powdered lithium borate can be blown, brushed or otherwise substantially uniformly transferred to the surface of the article. As previously indicated, the lithium borate may be any one or mixture of the previously described forms utilized in carrying out the method.

The amount of lithium borate deposited on the surface of the alumina article will vary, depending upon a number of factors, including the degree of porosity of the alumina, the degree of impermeableization necessary, etc. It has been found to be preferable to deposit a coating of lithium metaborate, $LiBO_2$, of between about 0.5 mm. and about 1 mm. in thickness when dry on the usual types of alumina articles during this step of the method. Such coatings are usually sufficient to readily fill most of the pores, depressions, etc., of the alumina adjacent the surface thereof, and yet are sufficiently thin so that large amounts of lithium borate are not left on the surface of the alumina in the treated ceramic product. The lithium borate coatings can be applied in a single treatment or in successive treatments until the desired amount is present on the surface of the alumina.

After the lithium borate has been substantially uniformly deposited on the surface of the alumina article by any of the previously described means, and the vehicle, if any, has been evaporated, the lithium borate is then caused to flow over the surface of the alumina and into the pores and depressions in said surface. In this connection, the alumina becomes fused and bonded to and impregnated with the lithium borate so that the permeability of the alumina to the passage of hot gases therethrough is substantially reduced, and so that a vacuum can be maintained by the alumina.

This porosity reducing step is carried out at a suitable sintering temperature for the mixture. At the selected temperature the desired flow and penetration of the lithium borate should occur within a reasonable amount of time, that is, within a few minutes, and without impairment of the alumina. It has been found that temperatures in the range of from about 800° C. to about 850° C. are preferred. Such temperatures are close to the melting point of lithium metaborate, $LiBO_2$, and below that of a fused mixture of lithium borate and alumina, that is, below about 930° C.

The porosity-reducing step is preferably, although not necessarily, carried out in a controlled atmosphere, that is, under a blanket of inert gas, such as argon, krypton, helium or the like. This condition substantially prevents any danger of reaction between impurities which might be present in the alumina and/or lithium borate and the atmosphere at the treating temperature.

The porosity-reducing step can be carried out in any suitable apparatus, for example, a sealed chamber within an electric furnace or the like, so that the controlled atmosphere and heating conditions can be maintained throughout the treatment period. In the event a blanket of inert gas is utilized as the controlled atmosphere, pressure may be applied in the treating chamber to facilitate peneration of the alumina by the lithium borate, etc.

As the porosity-reducing step proceeds, lithium borate continues to flow over the surface of the alumina and to some extent penetrates the areas of the body of alumina adjacent the surfaces, by means of the pores. At any rate, many of the pores of the alumina adjacent the surface thereof and the depressions in the surface of the alumina become filled with the lithium borate. The treating temperature is such that the lithium borate and alumina become firmly bonded together into a unitary structure of substantially reduced porosity.

The period of time necessary for the porosity-reducing step to be carried out to completion will vary, depending on various factors, including the heat-up and cool-down rates, the treating temperatures, concentration of lithium borate present, porosity of the alumina, presence or absence of a pressure, and other factors. A typical time for the porosity-reducing step may total about one-half hour, including the initial slow heat-up period, 5 minutes or so at the treating temperature of about 850° C. and the subsequent cool-off period, where a coating not more than about 1 mm. thick is applied under an inert gas blanket to an alumina article having the usual range of porosity.

After the lithium borate has been fully impregnated and integrated with and bonded to the alumina article at the treating temperature so as to substantially reduce the porosity thereof to a condition of substantially complete impermeability to the passage of hot gases and plasma therethrough, and so that a vacuum can be maintained by the alumina article under high temperature conditions, the alumina article is then cooled to ambient temperature. In this connection, heat to the alumina article can be shut off and the article can be allowed to cool, or conventional positive cooling means can be employed to regulate the rate and extent of cooling. After the cool-off period, the alumina article is ready for use as a finished product. Such a finished alumina article is schematically illustrated in FIGURES 1 and 2 of the accompanying drawings.

As a specific example of the method and product of the present invention, a slurry of lithium borate, $LiBO_2$, in ethyl alcohol was prepared and brushed at room temperature 70° F. on the surfaces of a hollow cylindrical tube of alumina. The alumina was prepared by a conventional ceramic casting technique at room temperature, followed by firing to hardness at 1700° C. The amount of slurry deposited on the alumina tube was controlled to provide a layer of lithium borate of approximately 0.75 mm. in average thickness, when dry, on all surfaces of the alumina tube. The tube was allowed to dry and was then placed in a chamber. The chamber was evacuated and flushed with argon gas. The chamber with its blanket of argon gas was then sealed, placed in an electric furnace and heated to 850° C. over a period of about 15 minutes. The chamber was maintained at 850° C. for a total of about 5 minutes, after which time it was cooled over a period of 10 minutes to approximately ambient temperature. The treated tube was then removed from the chamber and examined.

The treated tube was found to be, for all practical purposes, vacuum tight and impermeable to the passage of gases, even at elevated temperatures. It was also found to be a unitary structure, with the lithium borate fused with and impregnated in the alumina.

It has been found that improved novel alumina articles treated in accordance with the simple and inexpensive method of the present invention have a number of advantageous characteristics. They are relatively structurally stable and durable, as well as shock resistant at high temperatures, they are chemically inert and they have the described highly desirable reduced porosity and low atomic number. Accordingly, they are suitable for a wide variety of uses in the electrical and other fields. Various other advantages and uses of the improved ceramic products of the present invention are as set forth in the foregoing.

Such modifications in the method of the present invention, the steps, material and equipment for carrying out the method, and in the improved products provided by the method as are within the skill of those versed in the art are contemplated as being within the scope of the present invention.

What is claimed is the following:

1. A method of fabricating an improved high temperature lithium borate-containing ceramic porduct, which method comprises depositing lithium borate on the surface of an alumina ceramic article, melting said borate at a temperature at least about 800° C. but below 930° C., that is, below the melting point of a fused mixture of alumina and lithium borate, whereby said borate penetrates and fills pores of said alumina article so as to make said alumina substantially impermeable without dimensional distoriton of said article, and thereupon cooling said article to ambient temperature to provide a finished substantially impermeable alumina article having essentially the same shape as before said lithium borate deposition.

2. A method of fabricating an improved high temperature lithium borate-containing ceramic product, which method comprises depositing lithium borate on the surface of an alumina ceramic article, melting said borate by heating said article to a temperature within the range of from about 800° C. to about 850° C. whereby said borate fills pores of said article to make said alumina article substantially impermeable without dimensional distortion of said article, and thereupon cooling said article to ambient temperature to provide a finished substantially impermeable alumina article having essentially the same dimensions as before said borate deposition.

3. A method of fabricating an improved high temperature lithium borate-containing ceramic product, which method comprises depositing lithium borate in a layer between 0.5 mm. and about 1 mm. in thickness on the surface of a pre-shaped alumina ceramic article, melting said borate by heating said article to a temperature within the range of from about 800° C. to about 850° C. in a controlled atmosphere comprising inert gas, flowing said melted lithium borate over the surface of said alumina article, whereby said borate fills pores of said alumina article and is sintered therewith to make said article substanitally impermeable without dimensional distortion of said article, and thereupon cooling said article to ambient temperature to provide a finished substantially impermeable alumina article having essentially the same shape as before borate deposition.

4. An improved high temperature, ceramic product which is substantially impermeable, which product comprises a ceramic body of alumina, the surface and areas adjacent the surfaces of which are impregnated with and bonded to lithium borate at a temperature of at least about 800° C. and below 930° C., whereby said product is a unitary structure which is substantially impermeable.

5. An improved high temperature ceramic product which is substantially impermeable, which product comprises a ceramic body of alumina the surface and areas adjacent the surfaces of which are impregnated with and bonded to a layer of lithium borate, at a temperature between about 800° C. and about 850° C., the layer of lithium borate being between about 0.5 mm. and about 1 mm. in thickness, whereby said product is a unitary structure which is substantially impermeable.

References Cited in the file of this patent

UNITED STATES PATENTS

| | | |
|---|---|---|
| 2,686,134 | Wooding | Aug. 10, 1954 |
| 2,693,423 | Rogers | Nov. 2, 1954 |
| 2,919,209 | Bossard | Dec. 29, 1959 |
| 2,919,210 | Steierman | Dec. 29, 1959 |

FOREIGN PATENTS

| | | |
|---|---|---|
| 549,593 | Canada | Dec. 3, 1957 |

OTHER REFERENCES

"Surface Properties of Fused Salts and Glasses," American Ceramic Society, vol. 21, 1938, pages 205–213.